United States Patent
Thompson et al.

(10) Patent No.: US 7,549,803 B2
(45) Date of Patent: Jun. 23, 2009

(54) FIBER OPTIC GENERATOR CONDITION MONITOR

(75) Inventors: Edward D. Thompson, Casselberry, FL (US); Evangelos V. Diatzikis, Chuluota, FL (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 11/784,151

(22) Filed: Apr. 5, 2007

(65) Prior Publication Data

US 2008/0247702 A1    Oct. 9, 2008

(51) Int. Cl.
G02B 6/36    (2006.01)
(52) U.S. Cl. .............................. 385/88; 385/12; 250/382
(58) Field of Classification Search .................. 385/88, 385/12, 146, 13; 340/632, 679, 629; 374/141, 374/161; 250/374, 382
See application file for complete search history.

(56) References Cited

U.S. PATENT DOCUMENTS

| | | | |
|---|---|---|---|
| 3,427,880 A | 2/1969 | Grobel et al. | |
| 3,573,460 A | 4/1971 | Skala | |
| 4,074,137 A | 2/1978 | Carson et al. | |
| 4,080,535 A | 3/1978 | Phillips et al. | |
| 4,160,908 A | 7/1979 | Phillips | |
| 4,436,699 A | 3/1984 | Narato et al. | |
| 4,642,782 A | 2/1987 | Kemper et al. | |
| 4,698,756 A | 10/1987 | Gonzalez et al. | |
| 5,550,629 A | 8/1996 | Shapanus et al. | |
| 5,670,784 A * | 9/1997 | Cusack et al. ................ 250/372 |
| 5,734,689 A | 3/1998 | Copeland et al. | |
| 6,175,111 B1 | 1/2001 | Sorita et al. | |
| 6,200,088 B1 | 3/2001 | Zombo et al. | |
| 6,208,880 B1 | 3/2001 | Bentsen et al. | |
| 6,239,435 B1 * | 5/2001 | Castleman .............. 250/339.15 |
| 6,632,402 B2 * | 10/2003 | Blazewicz et al. ............. 422/84 |
| 6,911,894 B2 | 6/2005 | Bonne et al. | |
| 6,959,585 B2 | 11/2005 | Brosnihan et al. | |
| 6,965,240 B1 | 11/2005 | Litton et al. | |
| 6,998,618 B2 | 2/2006 | Twerdochlib | |
| 7,046,357 B2 | 5/2006 | Weinberger et al. | |
| 2003/0190262 A1 * | 10/2003 | Blazewicz et al. ............. 422/94 |
| 2003/0219207 A1 * | 11/2003 | Guy ............................ 385/49 |
| 2005/0061056 A1 * | 3/2005 | Sunshine et al. ............. 73/23.2 |
| 2007/0012349 A1 * | 1/2007 | Gaudiana et al. ............ 136/244 |
| 2007/0031089 A1 * | 2/2007 | Tessnow et al. ................ 385/49 |
| 2007/0192046 A1 * | 8/2007 | Hairston ........................ 702/45 |
| 2008/0283725 A1 * | 11/2008 | Hahn et al. .................. 250/207 |

FOREIGN PATENT DOCUMENTS

| | | |
|---|---|---|
| EP | 0 156 915 A1 | 10/1985 |
| EP | 0 706 048 A2 | 4/1996 |
| WO | WO 2004/040254 A2 | 5/2004 |

* cited by examiner

Primary Examiner—Ellen Kim

(57) ABSTRACT

A condition monitoring system for use in monitoring a generator. The condition monitoring system includes a sensor including an ion chamber located inside the generator for sensing particulates inside the generator. The sensor provides an electrical sensor output to an output converter that is also located inside the generator. The output converter converts the electrical sensor output to a light signal output which is transmitted out of the generator. An energy conversion device is located within the generator for receiving light energy from a light source outside of the generator and converting the light energy to electrical energy for powering the sensor and the output converter.

17 Claims, 3 Drawing Sheets

FIBER OPTIC GENERATOR CONDITION MONITOR

FIELD OF THE INVENTION

The present invention relates to an apparatus for detecting an overheating condition in a generator and, more particularly, to a condition monitoring system that is provided directly within a gas cooled generator for detecting the presence of particulates in the cooling gas associated with overheating of a part of the generator.

BACKGROUND OF THE INVENTION

Large turbine generators are typically cooled by forcing a stream of a cooling fluid, such as hydrogen, over the heat producing parts of the machine. FIG. 1 illustrates a conventional hydrogen-cooled generator 10. The generator 10 includes a rotor 11 and a stator 12 enclosed by a generator frame or housing 13. The rotor 11 generally includes a set of blades 14 for propelling hydrogen around the interior of the generator 10 to promote cooling, as indicated by the directed line segments 15 illustrating typical flow patterns for the hydrogen.

Because of the high flux densities present in the core of such a machine, localized overheating may cause degradation of the insulation disposed on the laminations and end turns. In addition, ventilation bypasses or blockages, cracked conductors, shorted laminations, or other malfunctions may contribute to overheating within the generator. Because of the potentially catastrophic consequences of such overheating and degradation, it is desirable to provide an early warning of an overheating condition.

Apparatus such as the generator condition monitor has been developed to provide early warning of an overheating condition. The generator condition monitor is a highly sensitive device which rapidly detects the presence of particles in the hydrogen atmosphere of a turbine generator. Operation of the generator condition monitor is based on the principle that very high concentrations of submicron particles are produced whenever any material within the generator is heated sufficiently to initiate thermal decomposition. When an overheating situation arises within the generator, organic materials in the overheated area are affected first and degrade, producing particulates which enter the gas stream. In conventional practice, special organic compounds may be deposited throughout the generator which particulate at much lower temperatures than most organic materials utilized in usual generator construction.

In one well known generator condition monitor, submicron particles are detected by their influence on the output current of an ion chamber which is arranged to collect the hydrogen ions which are produced by a low level radiation source in the hydrogen gas stream which carries the particles. In the absence of the particles, almost all of the hydrogen ions are collected, resulting in maximum output current of a magnitude determined by the strength of the radiation source and the ionization properties of the gas stream. With particles present, some ions combine with the particles and, because the particles are much larger than the ions, the mobility of the resultant charged particle is less, and relatively few are collected in the ion chamber. The result is a decrease in the output current of the ion chamber, this decrease being a function of the particle concentration and particle size. Such an arrangement is disclosed by Grobel et al. in U.S. Pat. No. 3,427,880, which patent is incorporated herein by reference.

In the past, it has typically been necessary to remove gas from the generator for analysis to determine the level of particulates in the gas. Piping would carry the pressurized gas from the generator to the measuring device which then had to be located nearby. In the case of a hydrogen cooled generator this would extend the hydrogen zone, require expensive hydrogen explosion proof piping and ion chamber assemblies, and introduce the danger of gas leaks. For air cooled generators expensive piping and generator modifications are required. For both air and hydrogen, this moved the measuring device farther from the source of the particulation which decreased the sensitivity of the measurement. Attempts to move the location of the measuring device inside the generator were complicated by the device's need for power, and by the proximity of high voltage generator components. For example, U.S. Pat. No. 6,998,618 provides a condition monitor in which the detector component of the monitor is located within the generator, but which may still require power lines to pass through the generator housing to power the monitor. There are minimum strike distances that must be maintained inside the generator; and it is generally not acceptable to locate metallic power cables for generator condition monitoring devices near the high voltage components that cause the particulation.

Accordingly, there continues to be a need for a generator condition monitoring system that permits the measurement device or sensor for detecting particulation in relatively close proximity to high voltage generator components.

SUMMARY OF THE INVENTION

In accordance with one aspect of the invention, a condition monitoring system is provided for use inside a structure. The condition monitoring system comprises a sensor located inside the structure for sensing particulates inside the structure. A signal processing system is located outside of the structure for receiving signals corresponding to an output of the sensor, and an energy conversion device is located within the structure for receiving a first form of energy provided from an energy source outside of the structure and converting the first form of energy to electrical energy for powering the sensor.

In accordance with another aspect of the invention, a condition monitoring system is provided in combination with a generator. The condition monitoring system comprises a sensor including an ion chamber for sensing particulates inside the generator, and the sensor provides an electrical sensor output. An output converter is located inside the generator for converting the electrical sensor output to a light signal output. An energy conversion device is located within the generator for receiving light energy from a light source outside of the generator and converting the light energy to electrical energy for powering the sensor and the output converter.

In accordance with a further aspect of the invention, a method of monitoring particulates in a gas is provided. The method comprises providing a sensor within a structure for sensing particulates in a gas within the structure. Light energy is conveyed from a light source outside of the structure into the structure. The light energy is converted into electrical energy inside the structure for powering the sensor, and signals corresponding to an output of the sensor are conveyed to a signal processing system located outside of the structure.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
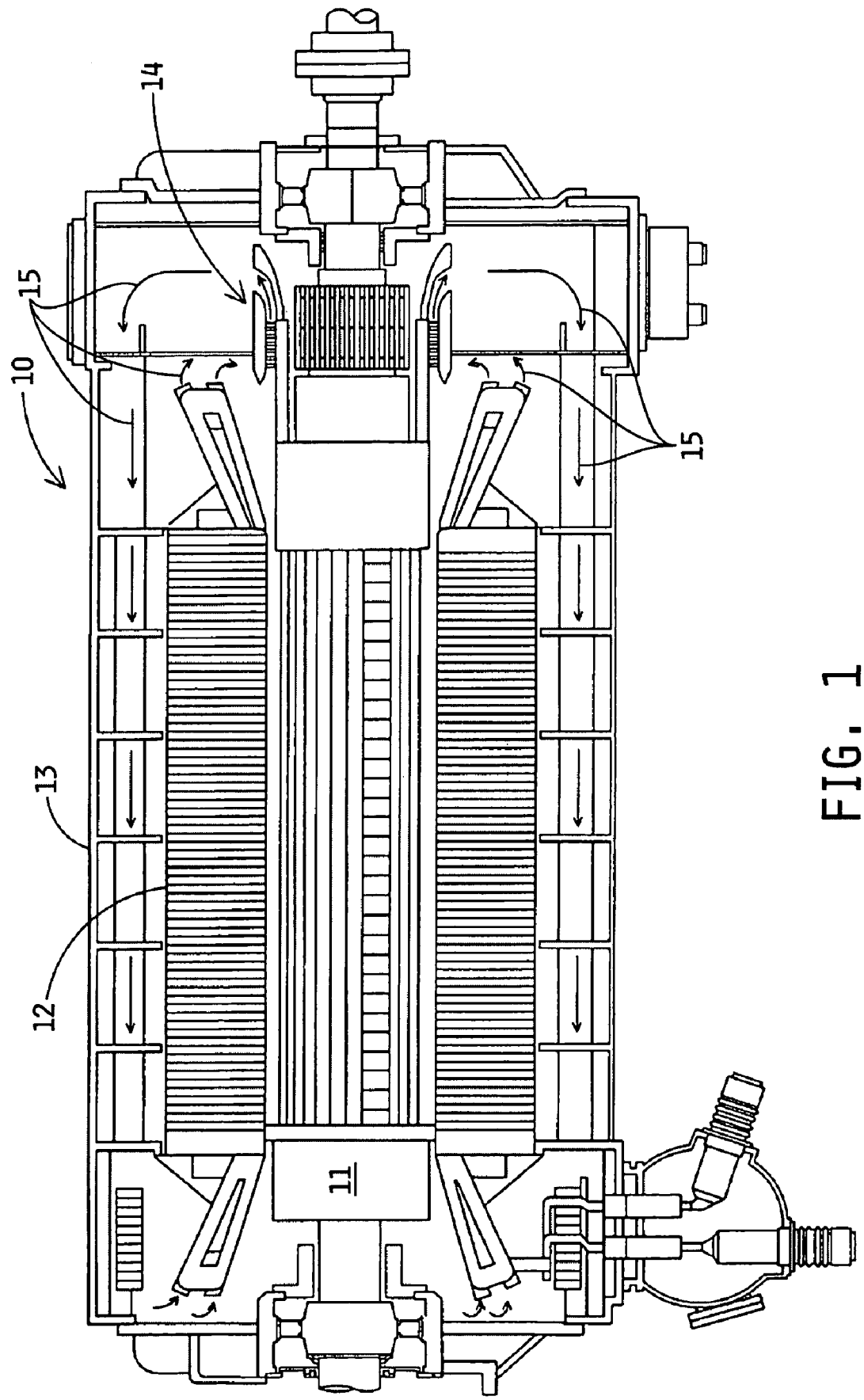
FIG. 1 illustrates a sectional view of a conventional hydrogen-cooled generator.
Figure 2:
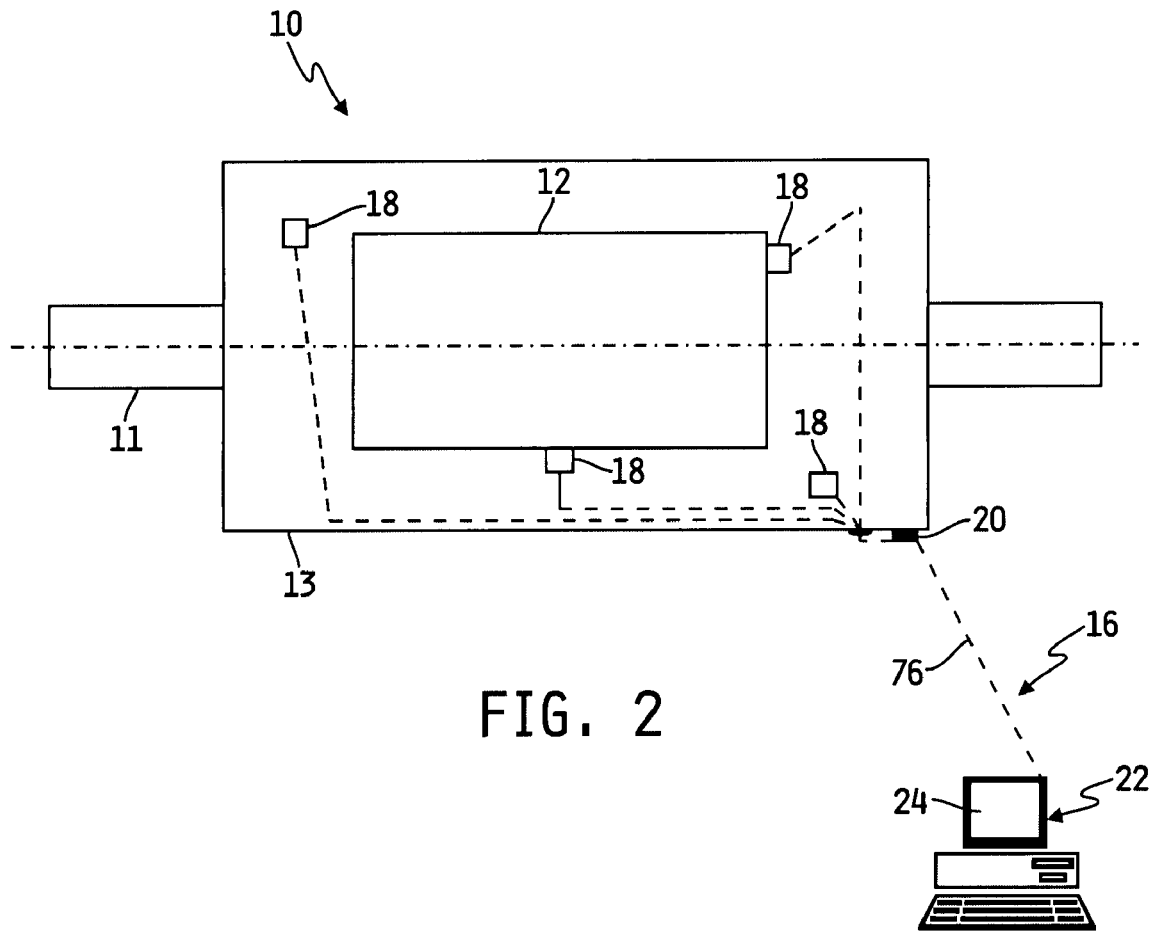
FIG. 2 is schematic view of a generator incorporating the condition monitoring system of the present invention.

FIG. 2 illustrates an exemplary embodiment of the invention in relation to a high voltage hydrogen-cooled generator 10, such as a medium or large turbine powered generator, and having a blower, i.e., blades 14 (FIG. 1), to cause a cooling gas, i.e., hydrogen, to circulate inside the generator to cool various parts within the generator 10. The generator 10 includes a frame or housing 13 containing the cooling gas, and a rotor 11 supported for rotation relative to a stator 12 to generate electricity. It should be noted that although the present description is directed to a hydrogen-cooled generator, the invention may also be used in devices utilizing other cooling gases, such as air.

A generator condition monitoring system 16 is provided including one or more condition monitors 18 that may be positioned at various locations within the housing 13 in contact with the flow of the cooling gas. The condition monitors 18 are positioned at predetermined locations within the housing 13 to detect overheating of various generator components, as indicated by detection of an increase in the concentration of particulates in the cooling gas. The condition monitoring system 16 further includes an electrical panel 20 provided outside the housing 13 and connected to the condition monitors 18, and a system processor 22 connected to the electrical panel 20. The system processor 22 may comprise a computer for controlling power to the condition monitors 18 and for processing signals received from the condition monitors 18 via the electrical panel 20, and may include a display 24 for displaying operating conditions of the generator 10 including an indication of overheating conditions detected by the condition monitors 18.

Figure 3:
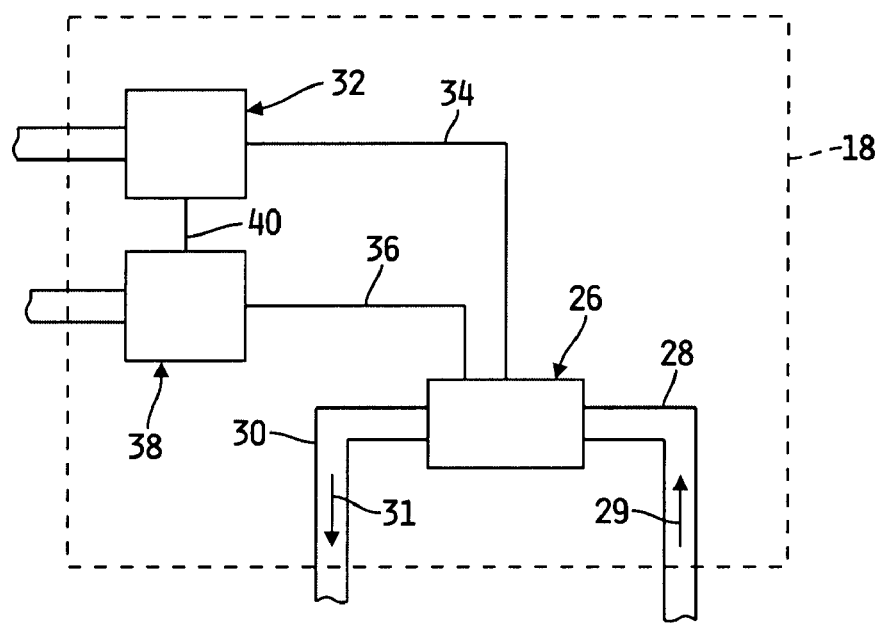
FIG. 3 is a schematic view of the components of the condition monitoring system for locating inside a generator.

Referring to FIG. 3, one of the condition monitors 18 is illustrated, depicting the components for the present condition monitoring system 16 that are located directly within the cooling gas, e.g., hydrogen, inside the generator 10. The condition monitor 18 comprises various components that may be exposed to the cooling gas within the housing 13, including a sensor or detector 26 for detecting particulates in the cooling gas and, in particular, for detecting pyrolytic products in the cooling gas that may be indicative of an overheating condition within the generator 10. The detector may be, for example, an ion chamber detector 26. The detector 26 includes an inlet 28 for providing an entering flow 29 of cooling gas samples to the detector 26, and an outlet 30 for providing a returning flow 31 of the gas samples from the detector 26 to the cooling gas flow. Electrical power for the detector 26 is provided internally of the generator 10, i.e., within the housing 13, by an energy conversion device 32 connected via an input 34 to the detector 26. The detector 26 provides an electrical output 36 indicative of the presence of particulates in the sampled cooling gas, and the electrical output 36 is received by an output converter 38. In addition, an input 40 from the energy conversion device 32 to the output converter 38 provides electrical power for the output converter 38.

Figure 4:
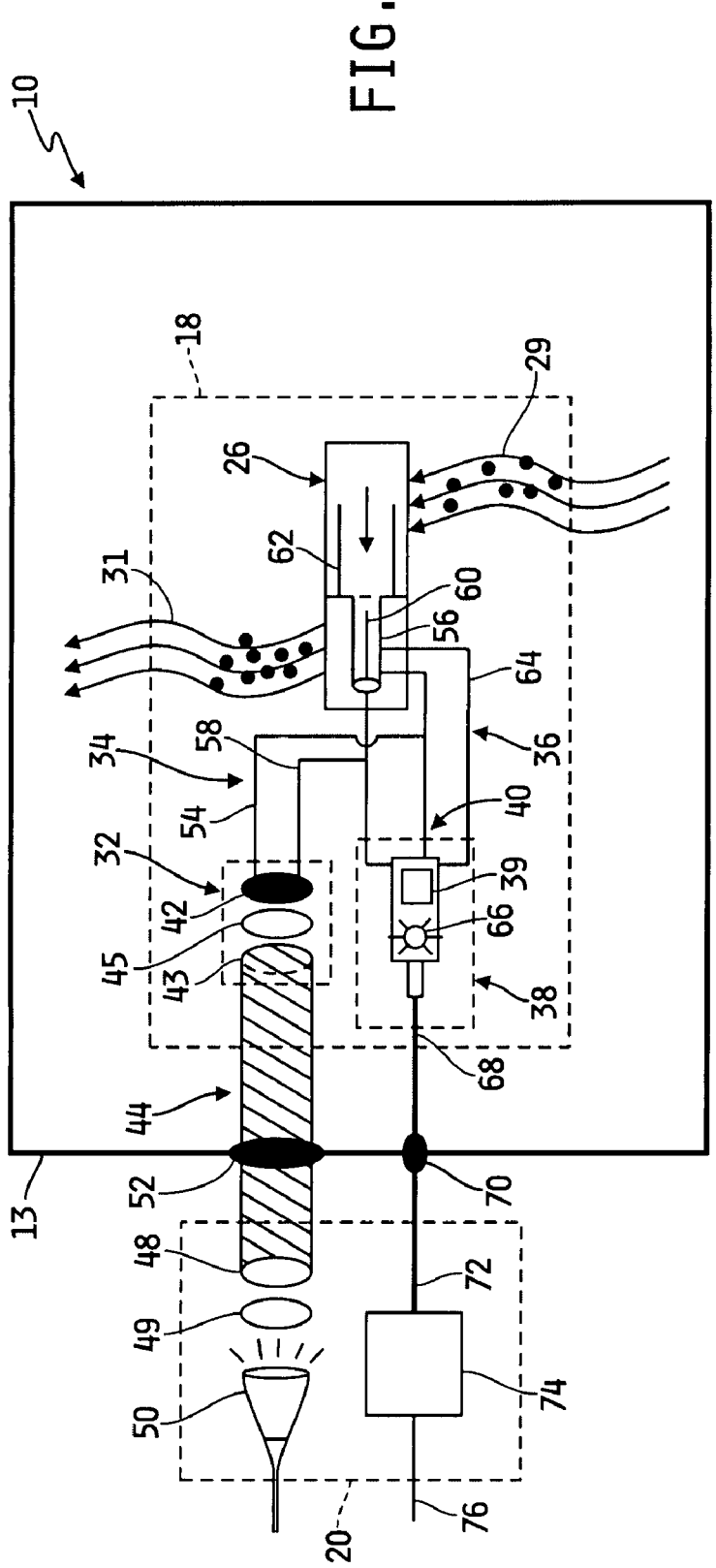
FIG. 4 is a diagrammatic view illustrating the components of the condition monitoring system in relation to a generator.

Referring further to FIG. 4, the energy conversion device 32 comprises a device for converting energy from a first form of energy to a second form of energy, where the first form of energy is preferably a non-electrically conducted energy and the second form of energy is preferably electrical energy. The energy conversion device preferably comprises an energy conversion cell 42, such as a photovoltaic cell, located adjacent to the end 43 of an optical fiber conduit 44 within the housing 13. An opposite end 48 of the optical fiber conduit 44 is located outside of the housing 13 and is positioned adjacent a light source 50. The optical fiber conduit 44 preferably passes through the wall of the housing 13 at a standard pressure seal 52. In the present embodiment, the light source 50 and end 48 of the optical fiber conduit 44 are shown located within the electrical panel 20 on the outside of the housing 13.

Figure 5:
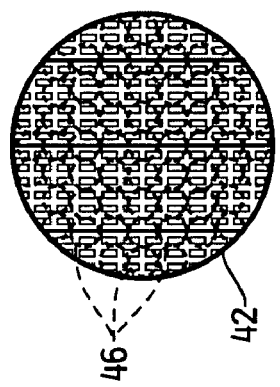
FIG. 5 is a diagrammatic view illustrating an enlarged view of an energy conversion device of the condition monitoring system shown in FIG. 4 with the location of a group of optical fibers for providing light energy superposed thereon.

The optical fiber conduit 44 may comprise one or more optical fibers 46 having ends superposed over the conversion cell 42, see FIG. 5. Further, it should be noted that the optical fibers 46 may comprise any type of optical fiber including, without limitation, glass core optical fibers and photonic-crystal fibers (PCF), such as PCFs with an air core. For example, PCFs that may be categorized as holey fiber PCFs.

The light source 50 may be a tungsten lamp or a halogen lamp, or may be any other light source for providing a source of light energy to the optical fiber conduit 44. The geometry of the optical fiber conduit 44 and the conversion cell 42 is selected to maximize the surface to energy conversion efficiency and to meet the particular power requirements of the detector 26 and output converter 38. In addition, it should be noted that a lens 49 may be provided between the light source 50 and the input end 48 of the optical fiber conduit 44 for focusing light provided to the optical fiber conduit 44, and a lens 45 may be provided between the output end 43 of the optical fiber conduit 44 and the conversion cell 42 for focusing light transmitted to the conversion cell 42.

The conversion cell 42 comprises a DC source of power within the generator 10, including a first output lead 54 for applying a voltage of a first polarity to a collector 56 in the detector 26 and a second output lead 58 for applying a voltage of a second polarity, opposite the first voltage, to an electrode 60. The output leads 54 and 58 define the output 34 from the conversion cell 42 to the detector 26. The reference numeral 62 designates a radiation source for irradiating the cooling gas, such as with α rays, as it passes through the detector 26 toward the collector 56. The output 36 comprises an electrical output lead 64 providing a current output from the collector 56 to the output converter 38 proportional to the passage of the ionized cooling gas molecules to the collector 56. Specifically, as the cooling gas, such as hydrogen gas, passes through the radiation source 62, it is ionized, and the ionized gas is guided by the electric field formed between the electrode 60 and the collector 56. If the cooling gas inside the generator 10 is free from pyrolytic particulates, the ionized gas molecules will move relatively freely under the influence of the electric field to produce a current in the output lead 64. However, if the cooling gas inside the generator 10 contains pyrolytic particulates, the flow of some of the ionized cooling gas molecules will be blocked by the particulates and a decreased proportion of the ionized cooling gas will reach the collector 56, such that a decreased current is produced in the output lead 64.

The output converter 38 is provided to convert the electrical output received on the output lead 64 of the detector 26 to an optical output. In particular, the output converter 38 may comprise a conventional circuit, depicted generally by 39, for converting the current of the output lead 64 to a digital signal, such as may be accomplished by an analog-to-digital converter. The output converter includes a light source 66 providing an input light signal to an output optical fiber conduit 68 that may comprise one or more optical fibers. The light source 66 may comprise one or more LEDs or laser diodes, or other light emitting devices. Power for the output converter 38 is provided via the input 40, which may comprise an input from each of the output leads 54, 58 extending from the conversion cell 42.

It should be noted that the output of the light source 66 is not limited to a digital signal. For example, the output of the light source 66 may include variations in the intensity of the light output, an on/off signal indicative of a preset threshold current from the output lead 64, or other optical indicators provided by the light source 66 with reference to the output received from the output lead 64.

The output optical fiber conduit 68 preferably passes through the wall of the housing 13 at a standard pressure seal 70. An output end 72 of the optical fiber conduit 68 provides an optical input to a signal processing unit 74 in the electrical panel 20. The signal processing unit 74 may comprise a conventional circuit for converting the optical output from the optical fiber conduit 68 to an electrical signal to be transmitted to the system processor 22, as depicted via line 76 (see FIG. 1). The electrical signal transmitted to the system processor 22 may be in the form of a digital signal, or may be in the form of an analog voltage or current signal.

From the above description, it should be apparent that the present condition monitoring system 16 provides a monitoring configuration wherein it is not necessary to convey the cooling gas out of the interior of the generator 10 to monitor the condition of the generator components. Further, the present system 16 avoids passing electrical conductors, and specifically metallic electrical conductors, through the housing wall of the generator 10 to provide power to the condition monitors 18 and to transmit signals from the condition monitors 18 to the system processor 22.

The condition monitoring system 16 may be implemented as a replacement for current condition monitoring systems. Alternatively, the condition monitoring system 16 may be implemented as a backup system or for verification of the operation of an existing condition monitoring system.

In addition, it should be understood that the present condition monitoring system 16 may be used with structures other than generators, where it may be desirable to avoid passage of metallic electrical conduits into an environment monitored by the system. For example, in addition to the present invention being applicable in both generators and motors, the system 16 may also be applied in monitoring for smoke or other environmental conditions in buildings, e.g., manufacturing plants, or other enclosed structures in which the presence of electrified conduits may be undesirable.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A condition monitoring system for use inside a structure, said condition monitoring system comprising:
   an electrically powered sensor located inside said structure for sensing particulates in a gas inside said structure;
   a signal processing system outside of said structure for receiving a light signal output corresponding to an electrical output of said sensor;
   an energy conversion device located within said structure for:
   receiving a first form of energy comprising light energy provided from an energy source outside of said structure;
   converting said first form of energy to electrical energy; and
   providing said electrical energy to said sensor for powering said sensor;
   a first conduit for conveying said first form of energy from said energy source outside of said structure to said energy conversion device located within said structure;
   an output converter located inside said structure for converting said electrical output of said sensor to said light signal output to be received by said signal processing system; and
   a second conduit for conveying said light signal output from said output converter located inside said structure to said signal processing system outside of said structure.

2. The condition monitoring system of claim 1, wherein said energy conversion device comprises a photovoltaic cell.

3. The condition monitoring system of claim 1, wherein said light energy is conveyed through an optical fiber conduit extending from a light source located outside of said structure to a location adjacent said energy conversion device.

4. The condition monitoring system of claim 3, including one or more lenses located between said light source and said optical fiber conduit and/or between said energy conversion device and said optical fiber conduit.

5. The condition monitoring system of claim 3, wherein said optical fiber conduit comprises a photonic-crystal fiber.

6. The condition monitoring system of claim 1, wherein said second conduit comprises an optical fiber conduit for conveying said light signal output from said output converter to said signal processing system.

7. The condition monitoring system of claim 1, wherein said energy conversion device provides power to said output converter.

8. The condition monitoring system of claim 1, wherein said output converter includes an LED or laser diode output and said light signal output comprises a digital signal.

9. A condition monitoring system in combination with a generator, said condition monitoring system comprising:
   an electrically powered sensor including an ion chamber for sensing particulates inside said generator, said sensor providing an electrical sensor output;
   an output converter located inside said generator for converting said electrical sensor output to a light signal output; and
   an energy conversion device located within said generator for receiving light energy from a light source outside of said generator and converting said light energy to electrical energy, and providing said electrical energy to said sensor and said output converter for powering said sensor and said output converter;
a first conduit for conveying said light energy from said light source outside of said generator to said energy conversion device located within said generator; and
a second conduit for conveying said light signal output from said output converter located inside said generator to structure outside of said generator.

10. The condition monitoring system of claim 9, including a signal processing system located outside of said generator for receiving and converting said light signal output to an electrical signal.

11. The condition monitoring system of claim 9, wherein said energy conversion device comprises a photovoltaic cell.

12. The condition monitoring system of claim 11, wherein said light energy is conveyed from said light source through an optical fiber conduit to a location adjacent said photovoltaic cell.

13. A method of monitoring particulates in a gas, the method comprising:
providing an electrically powered sensor within a structure for sensing particulates in a gas within said structure;
conveying light energy from a light source outside of said structure through a first conduit into said structure;
converting said light energy into electrical energy inside said structure;
powering said sensor with said electrical energy converted inside said structure; and conveying a light signal output corresponding to an electrical output of said sensor through a second conduit to a signal processing unit located outside of said structure, said light signal output converted inside said structure from said electrical output of said sensor.

14. The method of claim 13, including the step of converting said light signal output to an electrical signal at said signal processing unit.

15. The method of claim 13, wherein said electrical output of said sensor varies in relation to the concentration of said particulates present in said gas, and said light signal output comprises a digital signal corresponding to said electrical output of said sensor.

16. The method of claim 13, wherein said sensor comprises an ion chamber and said electrical energy forms a voltage potential within said ion chamber.

17. The method of claim 13, wherein said light energy is conveyed into said structure and said light signal output is conveyed out of said structure via optical fiber conduits.

* * * * *